US011917737B2

(12) United States Patent
Marquette

(10) Patent No.: US 11,917,737 B2
(45) Date of Patent: Feb. 27, 2024

(54) CIRCUIT FOR SHARING CURRENT BETWEEN PARALLEL LEDS OR PARALLEL STRINGS OF LEDS

(71) Applicant: Bio-Rad Laboratories, Inc., Hercules, CA (US)

(72) Inventor: Edward George Marquette, Oakland, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 17/877,630

(22) Filed: Jul. 29, 2022

(65) Prior Publication Data

US 2023/0164895 A1 May 25, 2023

Related U.S. Application Data

(60) Provisional application No. 63/228,466, filed on Aug. 2, 2021.

(51) Int. Cl.
*H05B 45/46* (2020.01)

(52) U.S. Cl.
CPC .................................... *H05B 45/46* (2020.01)

(58) Field of Classification Search
CPC ...... H05B 45/10; H05B 45/30; H05B 45/345; H05B 45/46; H05B 47/10
See application file for complete search history.

(56) References Cited

U.S. PATENT DOCUMENTS

| | | | |
|---|---|---|---|
| 8,674,621 | B2 | 3/2014 | Ge et al. |
| 9,000,674 | B2 | 4/2015 | Lynch et al. |
| 9,423,086 | B2 | 8/2016 | Peck et al. |
| 9,504,115 | B2 | 11/2016 | Van Erp |

(Continued)

FOREIGN PATENT DOCUMENTS

| | | | |
|---|---|---|---|
| CN | 101487572 | B | 7/2009 |
| CN | 101702849 | B | 5/2010 |

(Continued)

OTHER PUBLICATIONS

International Search Report and Written Opinion from PCT Appln. PCT/US2022/038919 dated Oct. 19, 2022; 11 pages.

(Continued)

*Primary Examiner* — Jimmy T Vu
(74) *Attorney, Agent, or Firm* — Kilpatrick Townsend and Stockton LLP

(57) ABSTRACT

A circuit for sharing current between parallel LEDs or parallel strings of LEDs, and a method of use of the same, are disclosed herein. The circuit for sharing current between parallel LED pathways can include a first LED pathway, a first transistor coupled to the first set of LEDs and that can control a first current through the first set of LEDs, and a first measurement node having a first sensed voltage. The circuit can include a second LED pathway, a second transistor coupled to the second set of LEDs and that can control a second current through the second set of LEDs, and a second measurement node having a second sensed voltage. The circuit includes a first differential amplifier and a second differential amplifier, each of which can compare sensed voltage and can apply a voltage to a gate of one of the first and second transistors.

24 Claims, 5 Drawing Sheets

(56) References Cited

U.S. PATENT DOCUMENTS

| | | | | |
|---|---|---|---|---|
| 2007/0046485 | A1 | 3/2007 | Grootes et al. | |
| 2013/0151919 | A1 | 6/2013 | Huynh | |
| 2013/0313985 | A1 | 11/2013 | Choi et al. | |
| 2015/0137689 | A1 * | 5/2015 | Hu | H05B 45/44 315/192 |
| 2015/0231408 | A1 | 8/2015 | Williams et al. | |
| 2017/0150570 | A1 * | 5/2017 | Kinnune | H05B 45/24 |
| 2018/0076336 | A1 | 3/2018 | DeGraff et al. | |
| 2018/0112861 | A1 * | 4/2018 | Hagelaar | H05K 3/303 |

FOREIGN PATENT DOCUMENTS

| | | | | |
|---|---|---|---|---|
| CN | 102196618 | B | | 9/2011 |
| CN | 103178055 | A | * | 6/2013 |
| CN | 104010426 | B | | 8/2014 |
| CN | 104902614 | B | | 9/2015 |
| CN | 105472818 | B | | 4/2016 |
| CN | 105722287 | B | | 6/2016 |
| CN | 205793495 | U | | 12/2016 |
| CN | 205844481 | U | | 12/2016 |
| CN | 108055718 | B | | 5/2018 |
| CN | 207897196 | U | | 9/2018 |
| CN | 210641106 | U | | 5/2020 |
| CN | 211606861 | U | | 9/2020 |
| CN | 211606870 | U | | 9/2020 |
| JP | 5735728 | B2 | | 6/2015 |

OTHER PUBLICATIONS

Arias, M., et al.; "An Overview of the AC-DC and DC-DC Converters for LED Lighting Applications"; *Automatika*; vol. 53, No. 2; 2012; pp. 156-172.

Roberts, S.; "DC/DC Book of Knowledge: Practical Tips for the User"; Third Edition; RECOM Engineering GmbH & Co KG, Austria; 2016; 287 pages.

* cited by examiner

CIRCUIT FOR SHARING CURRENT BETWEEN PARALLEL LEDS OR PARALLEL STRINGS OF LEDS

CROSS-REFERENCE TO RELATED APPLICATIONS

This application claims the benefit of U.S. Provisional Patent Application No. 63/228,466 filed Aug. 2, 2021, the entire disclosure of which is hereby incorporated by reference herein for all purposes.

BACKGROUND

A light-emitting diode (LED) is a semiconductor light source. LEDs are very efficiency as compared to traditional light bulbs, and increasingly can be used to generate light of one or several desired frequencies. The amount of light emitted by a diode varies based on an amount of current flowing through that diode.

Increasingly, LEDs are being used in multiple lighting applications. Due in part to their efficiency, large numbers of LEDs can be connected to allow generation of a desired illumination. However, when these LEDs are connected, at least partially in parallel current passing through different sets of LEDs can vary, resulting in inconsistent illumination. Accordingly, improvements to LED circuits are desired.

BRIEF SUMMARY

One aspect of the present disclosure relates to a circuit for sharing current between parallel LED pathways. The circuit includes a first LED pathway. The first LED pathway includes a first set of LEDs, the first set of LEDs including one or more first LEDs, a first transistor coupled to the first set of LEDs and that can control a first current through the first set of LEDs by altering a first conductivity between a first source and a first drain based on a first voltage applied to a first gate of the first transistor, and a first measurement node having a first sensed voltage. The circuit includes a second LED pathway. The second LED pathway includes a second set of LEDs, the second set of LEDs including one or more second LEDs, a second transistor coupled to the second set of LEDs and that can control a second current through the second set of LEDs by altering a second conductivity between a second source and a second drain based on a second voltage applied to a second gate of the second transistor, and a second measurement node having a second sensed voltage. The circuit includes a first differential amplifier that can compare the first sensed voltage to the second sensed voltage and to output the first voltage, which first voltage is applied to the first gate of the first transistor. The first differential amplifier can affect the first current through the first set of LEDs by altering the first conductivity between the first source and the first drain. The circuit includes a second differential amplifier that can compare the second sensed voltage to the first sensed voltage and output the second voltage, which second voltage is applied to the second gate of the second transistor. The second differential amplifier can affect the second current through the second set of LEDs by altering the second conductivity between the second source and the second drain.

In some embodiments, a first resistance generated by the first set of LEDs matches a second resistance generated by the second set of LEDs. In some embodiments, a first resistance generated by the first set of LEDs is greater than a second resistance generated by the second set of LEDs. In some embodiments, a first resistance generated by the first set of LEDs is less than a second resistance generated by the second set of LEDs. In some embodiments, the first set of LEDs includes a first number of LEDs, and the second set of LEDs includes a second number of LEDs. In some embodiments, the first number of LEDs is equal to the second number of LEDs. In some embodiments, the first number of LEDs is greater than the second number of LEDs.

In some embodiments, the first differential amplifier includes a first inverting input coupled to the first measurement node and a first non-inverting input coupled to the second measurement node. In some embodiments, the second differential amplifier includes a second inverting input coupled to the second measurement node and a second non-inverting input coupled to the first measurement node. In some embodiments, one of the inputs of the first differential amplifier is coupled to a bias node. In some embodiments, one of the inputs of the second differential amplifier is coupled to the bias node. In some embodiments, the first non-inverting input of the first differential amplifier is coupled to the bias node, and the second non-inverting input of the second differential amplifier is coupled to the bias node.

In some embodiments, the bias node can apply an additional voltage to each of the first non-inverting input and the second non-inverting input. In some embodiments, the additional voltage applied to the first non-inverting input is the same as the additional voltage applied to the second non-inverting input. In some embodiments, the additional voltage is less than one percent of either of the first sensed voltage and the second sensed voltage.

In some embodiments, the first differential amplifier and the second differential amplifier together balance the current through the first LED pathway and through the second LED pathway. In some embodiments, the additional voltage drives at least one of the first transistor and the second transistor to saturation. In some embodiments, balancing the current through the first LED pathway and through the second LED pathway includes relatively increasing the current through the first LED pathway to match the current through the second LED pathway. In some embodiments, balancing the current through the first LED pathway and through the second LED pathway includes relatively decreasing the current through the first LED pathway to match the current through the second LED pathway.

One aspect of the present disclosure relates to a method of controlling current through parallel LED pathways. The method includes generating a current with a current source coupled with a first LED pathway and a second LED pathway. The first LED pathway can include a first set of LEDs including one or more first LEDs, a first transistor coupled to the first set of LEDs and that can control a first current through the first set of LEDs by altering a first conductivity between a first source and a first drain based on a first voltage applied to a first gate of the first transistor, and a first measurement node having a first sensed voltage. The second LED pathway includes a second set of LEDs including one or more second LEDs, a second transistor coupled to the second set of LEDs and that can control a second current through the second set of LEDs by altering a second conductivity between a second source and a second drain based on a second voltage applied to a second gate of the second transistor, and a second measurement node having a second sensed voltage. The method further includes receiving a first sense voltage and a second sense voltage as inputs to a first differential amplifier, adjusting the first conductivity of the first transistor by applying a first voltage output from the first differential amplifier to the first gate of the first transistor, receiving the first sense voltage and the second sense voltage as inputs to a second differential amplifier, and adjusting the second conductivity of the second transistor by applying a second voltage output from the second differential amplifier to the second gate of the second transistor. In some embodiments, the first conductivity of the first transistor and the second conductivity of the second transistor are adjusted to match a first current passing through the first LED pathway to a second current passing through the second LED pathway.

In some embodiments, the first LED pathway has a first resistance generated by a first set of LEDs and the second LED pathway has a second resistance generated by a second set of LEDs. In some embodiments, the first resistance matches the second resistance. In some embodiments, the first differential amplifier receives the first sense voltage at a first inverting input and receives the second sense voltage at a first non-inverting input, and the second differential amplifier receives the second sense voltage at a second inverting input and receives the first sense voltage at a second non-inverting input.

In some embodiments, the method includes applying a first bias voltage to the first non-inverting input of the first differential amplifier and a second bias voltage to the second non-inverting input of the second differential amplifier. In some embodiments, the first bias voltage and the second bias voltage are equal. In some embodiments, the first bias voltage and the second bias voltage are each less than one percent of either of the first sense voltage and the second sense voltage.

In some embodiments, the first bias voltage and the second bias voltage drives at least one of the first transistor and the second transistor to saturation. In some embodiments, matching a first current passing through the first LED pathway to a second current passing through the second LED pathway includes relatively increasing the current through the first LED pathway to match the current through the second LED pathway. In some embodiments, matching a first current passing through the first LED pathway to a second current passing through the second LED pathway includes relatively decreasing the current through the first LED pathway to match the current through the second LED pathway.

DETAILED DESCRIPTION

Matching current through parallel paths of LEDs results in consistent illumination between the parallel paths. However, achieving this equal current through parallel paths can be challenging. This is particularly the case when each of the paths has a different resistance. This can arise due to, for example, the paths having a different number of the same LEDs, the paths having different LEDs, and/or the paths having different electrical properties, such as total resistances. Further, this resistance can change over time.

When parallel LED paths do not have equal currents, the performance of the LEDs can be adversely impacted. This can include failure of the LED path with the lower current to generate a desired amount of light, or in some instances to generate any light. Additionally, the path with higher current may have excessive heating of the LEDs, decreased efficiency, and decreased LED life.

Typically, these problems have been addressed by taking great effort to ensure that the parallel pathways are equal. This can include matching the number and/or properties of LEDs in the different pathways, or through the inclusion of ballast resistors in some or all of the parallel pathways. These solutions have been adequate, but have limitations. First, while these solutions approximately equalize current flowing through parallel pathways, this equalization is not perfect. Further, this equalization is static, and does not adjust to any changes to either of the pathways such as, the addition or removal of one or several LEDs. An additional disadvantage of these solutions is the power loss in the resistor.

The present application relates to a circuit for sharing current between parallel LED pathways. This circuit actively senses and compares attributes of each of the parallel pathways, and based on the result of this comparison, generates a control signal which affects a relative amount of current flowing through one or both of the pathways.

Figure 1:
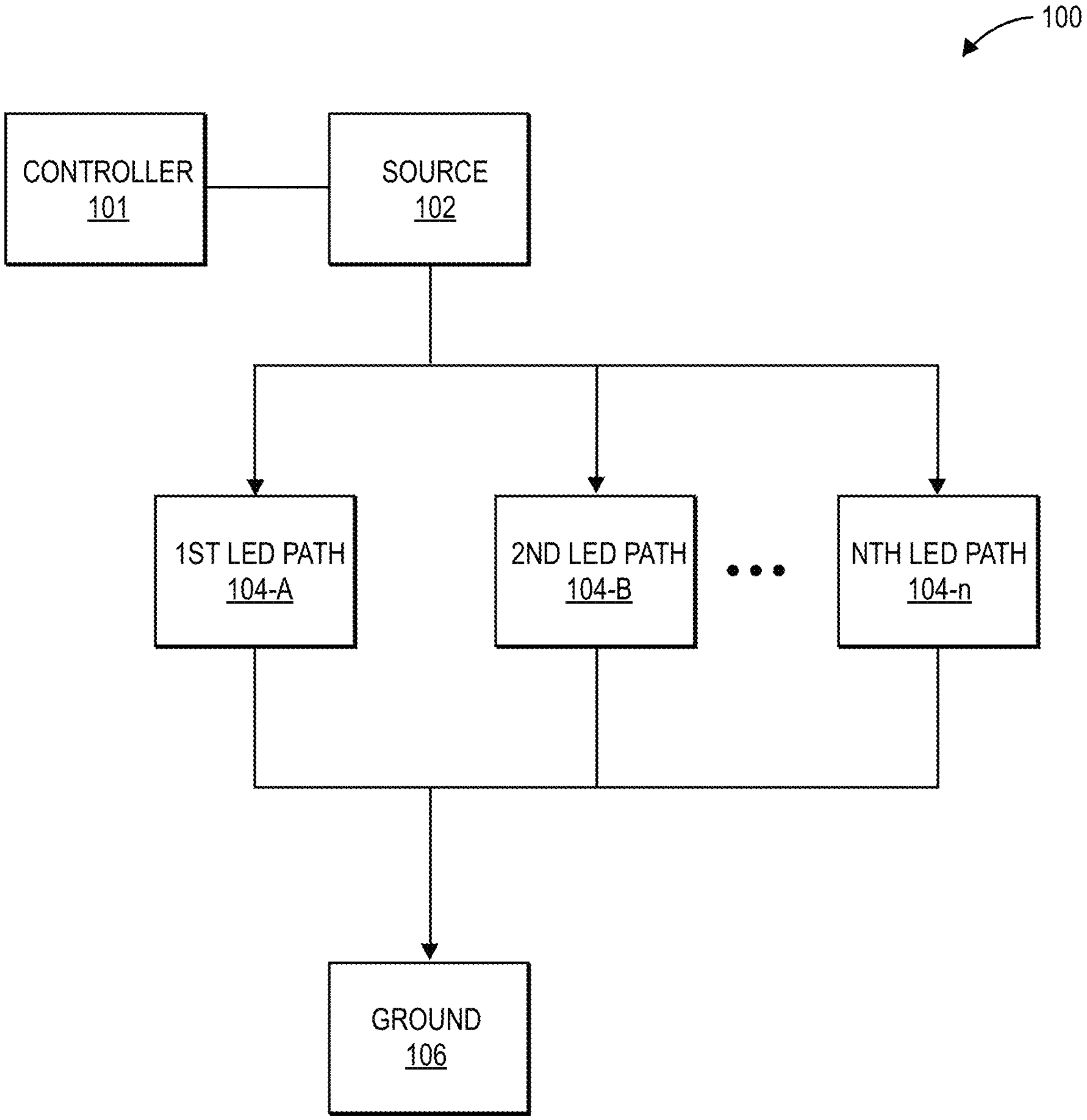
FIG. 1 is a high-level schematic illustration of one embodiment of a circuit for sharing current between parallel LED pathways.

One embodiment of this circuit is shown in FIG. 1, which specifically is a high-level schematic illustration of one embodiment of a circuit 100 for sharing current between parallel LED pathways. The circuit 100 can include a source 102. In some embodiments, the source 102 can be a current source. In some embodiments, the source 102 can comprise a controlled current source and/or a constant current source. In some embodiments, the circuit 100 can include a controller 101, which can control the source 102. In some embodiments, for example, the controller 101 can control the source 102 to thereby control the generation of a current for passing through the parallel LED pathways.

The circuit 100 can further include a plurality of parallel pathways 104. This can include at least a first LED path 104-A and a second LED path 104-B. In some embodiments, the circuit can include a number of additional LED paths 104-*n* such as, for example, 1, 2, 3, or 4 additional LED paths. Each of these LED paths 104 can connect to the source 102, and can connect to a ground 106. As shown in FIG. 1, these LED paths 104 are arranged in parallel.

Figure 2:
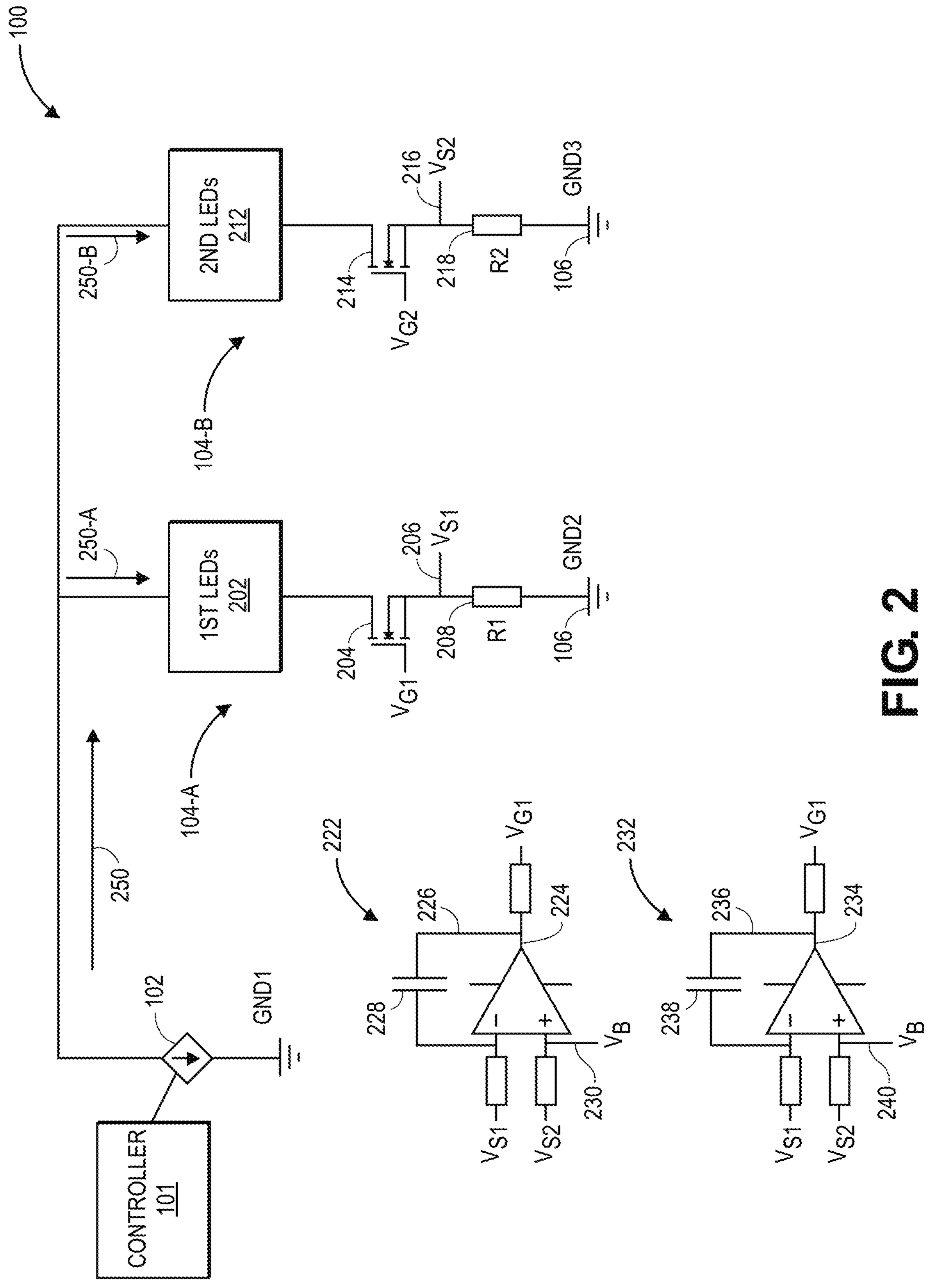
FIG. 2 is a detailed schematic illustration of one embodiment of a circuit for sharing current between parallel LED pathways.

With reference now to FIG. 2, a detailed schematic illustration of one embodiment of the circuit 100 for sharing current between parallel LED pathways. As seen in FIG. 2, the circuit includes a source 102, a first LED path 104-A connected to ground 106 and a second LED path 104-B connected to ground 106.

The first LED path 104-A includes a first set of LEDs 202, a first transistor 204, a first measurement node 206, and a first resistor 208. In some embodiments, and as seen in FIG. 2, the first set of LEDs 202 can be located relatively more proximate to the source 102 than any other component of the first LED path 104-A. In some embodiments, however, one or several other components of the first LED path 104-A can be located relatively more proximate to the source 102 than the LEDs 202. The first transistor 204 can be located between the first set of LEDs 202 and the ground 106, the first measurement node 206 can be located between the first transistor 204 and the ground 106, and the first resistor 208 can be located between the first measurement node 206 and the ground 106.

The first set of LEDs 202 can include one or several first LEDs. These first LEDs can be the same type of LEDs and/or have the same specification. In some embodiments, these first LEDs in the first set of LEDs 202 can include multiple different types of LEDs and/or multiple different specifications. In some embodiments, these first LEDs can include one or several colors.

The first transistor 204 can comprise a field-effect (FET) transistor. In some embodiments, the first transistor 204 can comprise any desired type of transistor including, for example, a Metal-oxide-semiconductor FET (MOSFET) and/or a bipolar transistor. In some embodiments, the first transistor 204 can comprise an n-channel transistor or a p-channel transistor. In some embodiments, the first transistor 204 can be configured to control a first current passing through the first set of LEDs 202. In some embodiments, the first transistor 204 can control the first current passing through the first set of LEDs 202 by altering a first conductivity of the first transistor 204 between a first source and a first drain of the first transistor 204.

In the embodiment shown in FIG. 2, for example, the first transistor 204 can comprise an n-channel MOSFET having a drain coupled to the first set of LEDs 202 and a source coupled to the resistor 208. In some embodiments, the first conductivity of the first transistor 204 can be controlled by the application of first voltage ($V_{G1}$) to the gate of the first transistor 204. $V_{G1}$ will be discussed in greater detail below.

A first sensed voltage ($V_{S1}$), which reflects the LED current, can be sensed and/or measured at the first measurement node 206. In some embodiments, and as shown in FIG. 2, a resistor 208 can be placed between the first measurement node 206 and the ground 106, thereby creating the first sensed voltage when current passes through the first LED pathway 104-A.

The second LED path 104-B includes a second set of LEDs 212, a second transistor 214, a second measurement node 216, and a second resistor 218. In some embodiments, and as seen in FIG. 2, the second set of LEDs 212 can be located relatively more proximate to the source 102 than any other component of the second LED path 104-B. In some embodiments, however, one or several other components of the second LED path 104-B can be located relatively more proximate to the source 102 than the LEDs 212. The second transistor 214 can be located between the second set of LEDs 212 and the ground 106, the second measurement node 216 can be located between the second transistor 214 and the ground 106, and the second resistor 218 can be located between the second measurement node 216 and the ground 106.

The second set of LEDs 212 can include one or several second LEDs. These second LEDs can be the same type of LEDs and/or have the same specification. In some embodiments, these second LEDs in the second set of LEDs 212 can include multiple different types of LEDs and/or multiple different specifications. In some embodiments, these second LEDs can include one or several colors.

In some embodiments, the first set of LEDs 202 can generate a first load, which can be a first resistance and/or a first impedance, and the second set of LEDs 212 can generate a second load, which can be a second resistance and/or a second impedance. In some embodiments, the first resistance can match the second resistance, and in some embodiments, the first resistance can be different than the second resistance. In some embodiments, for example, the first resistance can be greater than the second resistance, or the first resistance can be less than the second resistance.

In some embodiments, the first set of LEDs 202 can comprise a first number of LEDs, and the second set of LEDs 212 can comprise a second number of LEDs. In some embodiments the first number of first LEDs can be the same as, or different than the second number of second LEDs. Specifically, the first number of LEDs can be the same as the second number of LEDs, the first number of LEDs can be greater than the second number of LEDs, or the first number of LEDs can be less than the second number of LEDs. In some embodiments, the first set of LEDs 202 can have forward voltage drops that are lower, higher, or equal to the forward voltage drops of the second set of LEDs 212.

The second transistor 214 can comprise a field-effect (FET) transistor. In some embodiments, the second transistor 214 can comprise any desired type of transistor including, for example, a Metal-oxide-semiconductor FET (MOSFET), and/or a bipolar transistor. In some embodiments, the second transistor 214 can comprise an n-channel transistor or a p-channel transistor. The second transistor 214 can be same type of transistor as the first transistor 202.

In some embodiments, the second transistor 214 can be configured to control a second current passing through the second set of LEDs 212. In some embodiments, the second transistor 214 can control the second current passing through the second set of LEDs 212 by altering a second conductivity of the second transistor 214 between a second source and a second drain of the second transistor 214.

In the embodiment shown in FIG. 2, for example, the second transistor 214 can comprise an n-channel MOSFET having a drain coupled to the second set of LEDs 212 and a source coupled to the resistor 218. In some embodiments, the second conductivity of the second transistor 214 can be controlled by the application of second voltage ($V_{G2}$) to the gate of the second transistor 214. $V_{G2}$ will be discussed in greater detail below.

A second sensed voltage ($V_{S2}$) can be sensed and/or measured at the second measurement node 216. In some embodiments, and as shown in FIG. 2, a resistor 218 can be placed between the second measurement node 216 and the ground 106, thereby creating the second sensed voltage when current passes through the second LED pathway 104-B.

The circuit 100 can further include a first differential amplifier 222. The first differential amplifier 222 can be configured to compare the first sensed voltage ($V_{S1}$) to the second sensed voltage ($V_{S2}$), and to output a first voltage ($V_{G1}$). In some embodiments, this first voltage ($V_{G1}$) can be generated based on a difference between the first sensed voltage ($V_{S1}$) and the second sensed voltage ($V_{S2}$). The first voltage ($V_{G1}$) is applied to the first gate of the first transistor 204. In some embodiments, this first voltage ($V_{G1}$) can affect the first conductivity of the first transistor 204 between the first source and the first drain, and thus, the first differential amplifier 222 can be configured to affect the first current through the first set of LEDs 202 by altering the first conductivity between the first source and the first drain of that first differential amplifier 222. Further, for a current source, affecting the first conductivity between the first source and the first drain of that first differential amplifier 222, and thus the first current through the first set of LEDs 202, likewise affects the second current through the second set of LEDs 212.

In some embodiments, and as shown in FIG. 2, the first differential amplifier 222 can include a first inverting input (indicated with a "–" sign), and a first non-inverting input (indicated with a "+" sign). The first inverting input of the first differential amplifier 222 can be coupled to the first measurement node 206, and thus can sense the first sensed voltage ($V_{S1}$). In some embodiments, the first inverting input of the first differential amplifier 222 is further coupled to a first output 224 of the first differential amplifier 222 via a first feedback loop 226 that can, in some embodiments, comprise a first capacitor 228. The first non-inverting input of the first differential amplifier 222 can be coupled to the second measurement node 216, and thus can sense the second sensed voltage ($V_{S2}$).

In some embodiments, the first non-inverting input of the first differential amplifier 222 can be connected to a first bias node 230 that can apply a first bias voltage ($V_B$), which first bias voltage can be a positive bias voltage, to the first non-inverting input. Alternatively, the first inverting input of the first differential amplifier 222 can be connected to a first bias node 230 that can apply a first bias voltage ($V_B$), which first bias voltage can be a negative bias voltage, to the first inverting input. The first bias voltage ($V_B$) can be combined with the second sensed voltage ($V_{S2}$) at the first non-inverting input of the first differential amplifier 222. This first bias voltage ($V_B$) can increase a voltage applied to the first non-inverting input of the first differential amplifier 222. In some embodiments, the first bias voltage ($V_B$) can be configured to increase the voltage applied to the first non-inverting input of the first differential amplifier 222 to bias the signal applied to the gate of the first transistor 204 to achieve a minimum voltage drop and thus a minimum power dissipation in the first transistor 204 while matching the current through the second transistor 214. In some embodiments, this maximum a current can be achieved when one of the first and second transistors 204, 214 reaches saturation.

The circuit 100 can further include a second differential amplifier 232. The second differential amplifier 232 can be configured to compare the second sensed voltage ($V_{S2}$) to the first sensed voltage ($V_{S1}$), and to output a second voltage ($V_{G2}$). In some embodiments, this second voltage ($V_{G2}$) can be generated based on a difference between the second sensed voltage ($V_{S2}$) and the first sensed voltage ($V_{S1}$). The second voltage ($V_{G2}$) is applied to the second gate of the second transistor 214. In some embodiments, this second voltage ($V_{G2}$) can affect the second conductivity of the second transistor 214 between the second source and the second drain, and thus, the second differential amplifier 232 can be configured to affect the second current through the second set of LEDs 212 by altering the second conductivity between the second source and the second drain of that second differential amplifier 232.

In some embodiments, and as shown in FIG. 2, the second differential amplifier 232 can include a second inverting input (indicated with a "–" sign), and a second non-inverting input (indicated with a "+" sign). The second inverting input of the second differential amplifier 232 can be coupled to the second measurement node 216, and thus can sense the second sensed voltage ($V_{S1}$). The second inverting input of the second differential amplifier 232 is further coupled to a second output 234 of the second differential amplifier 232 via a second feedback loop 236 that can, in some embodiments, comprise a second capacitor 238. The second non-inverting input of the second differential amplifier 232 can be coupled to the first measurement node 206, and thus can sense the first sensed voltage ($V_{S1}$).

The second non-inverting input of the second differential amplifier 232 can be connected to a second bias node 240 that can apply a second bias voltage ($V_B$), which second bias voltage can be a positive bias voltage, to the second non-inverting input. The second bias voltage ($V_B$) can be combined with the first sensed voltage ($V_{S1}$) at the second non-inverting input of the second differential amplifier 232. Alternatively, the second inverting input of the second differential amplifier 232 can be connected to the second bias node 240 that can apply a second bias voltage ($V_B$), which second bias voltage can be a negative bias voltage, to the second inverting input. This second bias voltage ($V_B$) can increase a voltage applied to the second non-inverting input of the second differential amplifier 232. In some embodiments, the second bias voltage ($V_B$) can be configured to increase the voltage applied to the second non-inverting input of the second differential amplifier 232 to bias the signal applied to the gate of the second transistor 214 to achieve a minimum voltage drop and thus a minimum power dissipation through the second transistor 214 while matching the current through the first transistor 204. In some embodiments, this maximum a current can be achieved when one of the first and second transistors 204, 214 reaches saturation.

In some embodiments, instead of including a first differential amplifier 222 and a second differential amplifier 232, the circuit 100 can include a first ADC and a second ADC, each of which ADCs could sense the current passing through one of the pathways. Based on the sensed current, a first DAC could be used to control a voltage applied to the gate of the first transistor 204, and a second DAC could be used to control a voltage applied to the gate of the second transistor 214.

In some embodiments, the first bias node 230 and the second bias node 240 can be the same nodes. In some embodiments, each of the first and second bias nodes 230, 240 are configured to apply an additional voltage to each of the first non-inverting input and the second non-inverting input in the form of the first bias voltage ($V_B$) and the second bias voltage ($V_B$). In some embodiments, the first bias voltage ($V_B$) can be the same as the second bias voltage ($V_B$). Thus, in some embodiments, the first bias voltage ($V_B$) applied to the first non-inverting input is the same as the second bias voltage ($V_B$) applied to the second non-inverting input.

In some embodiments, each of the first and second bias voltages ($V_B$) can be sized to provide a slight bias to drive one of the first and second transistors 204, 214 towards saturation. In some embodiments, for example, each of the first and second bias voltages ($V_B$) can be less than 1%, 2%, 3%, 4%, 5%, or any other or intermediate percent of one or both of the first sensed voltage ($V_{S1}$) and the second sensed voltage ($V_{S2}$). In some embodiments, the pathway needing the most voltage will actually reach saturation, whereas the other pathway will operate at less than saturation.

In some embodiments, and as discussed with respect to FIG. 1, the circuit 100 can include a controller 101, which can control the source 102 to generate current for passing through the LED paths 104. In some embodiments, for example, the controller can direct the source 102 to generate a current 250. This current 250 can split into a first current part 250-A passing through the first LED path 104-A and a second current part 250-B passing through the second LED path 104-B. The first differential amplifier 222 and the second differential amplifier 232 together balance the current through the first LED pathway 104-A and through the second LED pathway 104-B. In some embodiments, balancing the current through the first LED pathway 104-A and through the second LED pathway 104-B comprises relatively increasing the current through the first LED pathway 104-A to match the current through the second LED pathway 104-B. In some embodiments, balancing the current through the first LED pathway 104-A and through the second LED pathway 104-B comprises relatively decreasing the current through the first LED pathway 104-A to match the current through the second LED pathway 104-B.

The first differential amplifier 222 can sense the first sensed voltage ($V_{S1}$) and the second sensed voltage ($V_{S2}$) and can control the first transistor 204 based on a comparison of these sensed voltages ($V_{S1}$), ($V_{S2}$).

If the first sensed ($V_{S1}$) is greater than the second sensed voltage ($V_{S2}$), the first differential amplifier 222 can generate a first output voltage ($V_{G1}$) that can control the first transistor 204 to decrease current flowing through the first transistor 204 and thereby to equalize the current flowing through the first and second transistors 204, 214. Similarly, if the first sensed ($V_{S1}$) is less than the second sensed voltage ($V_{S2}$), the first differential amplifier 222 can generate a first output voltage ($V_{G1}$) that can control the first transistor 204 to increase current flowing through the first transistor 204 and thereby to equalize the current flowing through the first and second transistors 204, 214.

The second differential amplifier 232 can sense the first sensed voltage ($V_{S1}$) and the second sensed voltage ($V_{S2}$) and can control the second transistor 214 based on a comparison of these sensed voltages ($V_{S1}$), ($V_{S2}$). If the first sensed voltage ($V_{S1}$) is greater than the second sensed voltage ($V_{S2}$), the second differential amplifier 232 can generate a second output voltage ($V_{G2}$) that can control the second transistor 214 to decrease current flowing through the second transistor 214 and thereby equalize the current flowing through the first and second transistors 204, 214. Similarly, if the first sensed ($V_{S1}$) is less than the second sensed voltage ($V_{S2}$), the second differential amplifier 232 can generate a second output voltage ($V_{G2}$) that can control the second transistor 214 to increase current flowing through the second transistor 214 and thereby to equalize the current flowing through the first and second transistors 204, 214.

Figure 3:
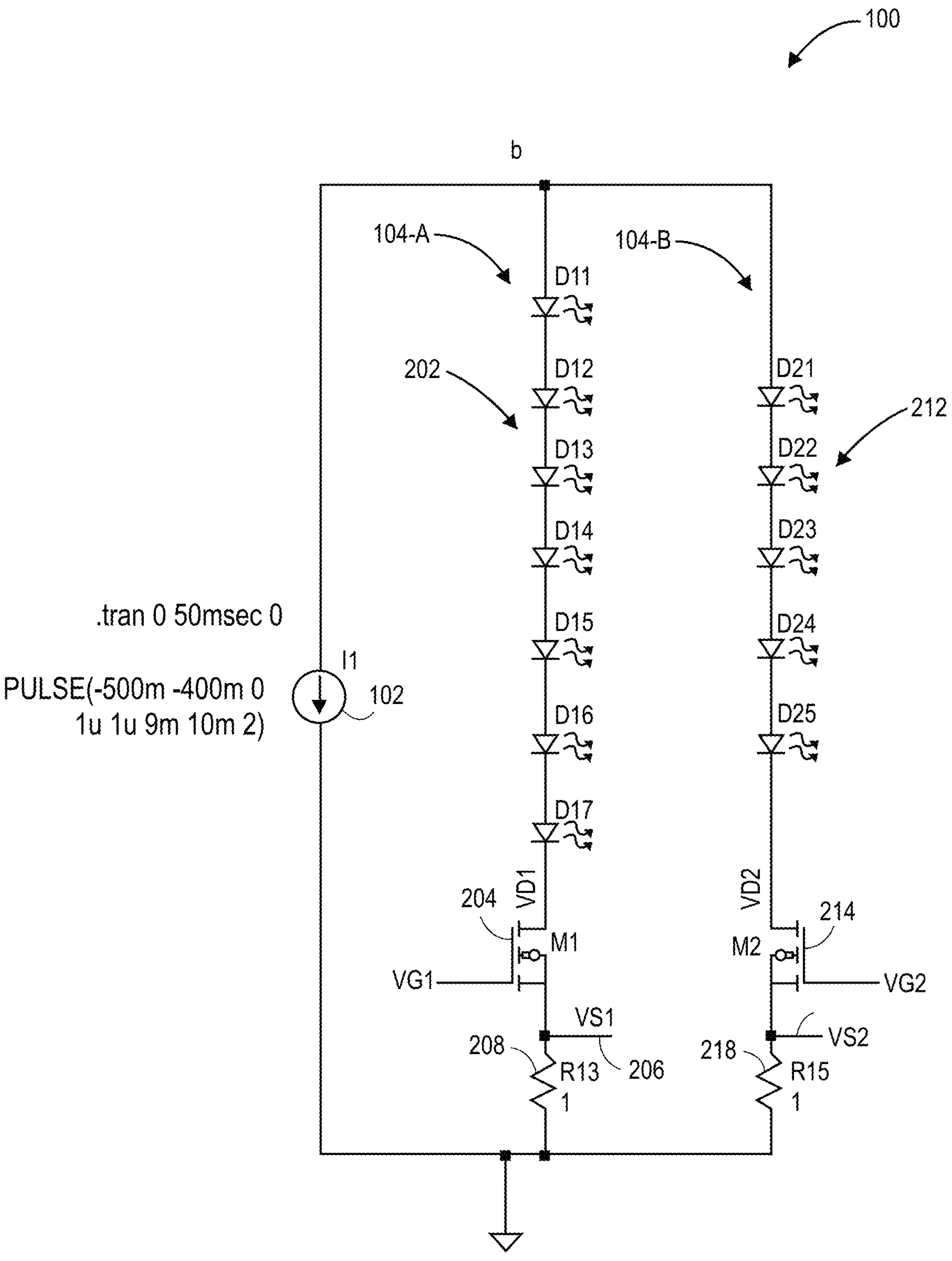
FIG. 3 is a schematic illustration of an implementation of one embodiment of a circuit for sharing current between parallel LED pathways.

With reference now to FIG. 3, a schematic illustration of a specific implementation of one embodiment of circuit 100 is shown. The circuit 100 in FIG. 3 was created to evaluate the effectiveness of the circuit 100 at equalizing current flowing through the parallel LED pathways 104-A, 104-B. The first pathway 104-A includes a first set of LEDs 202, and the second pathway 104-B includes a second set of LEDs 212. As seen in FIG. 3, the first set of LEDs 202 includes more LEDs than are included in the second set of LEDs 212.

Figure 4:
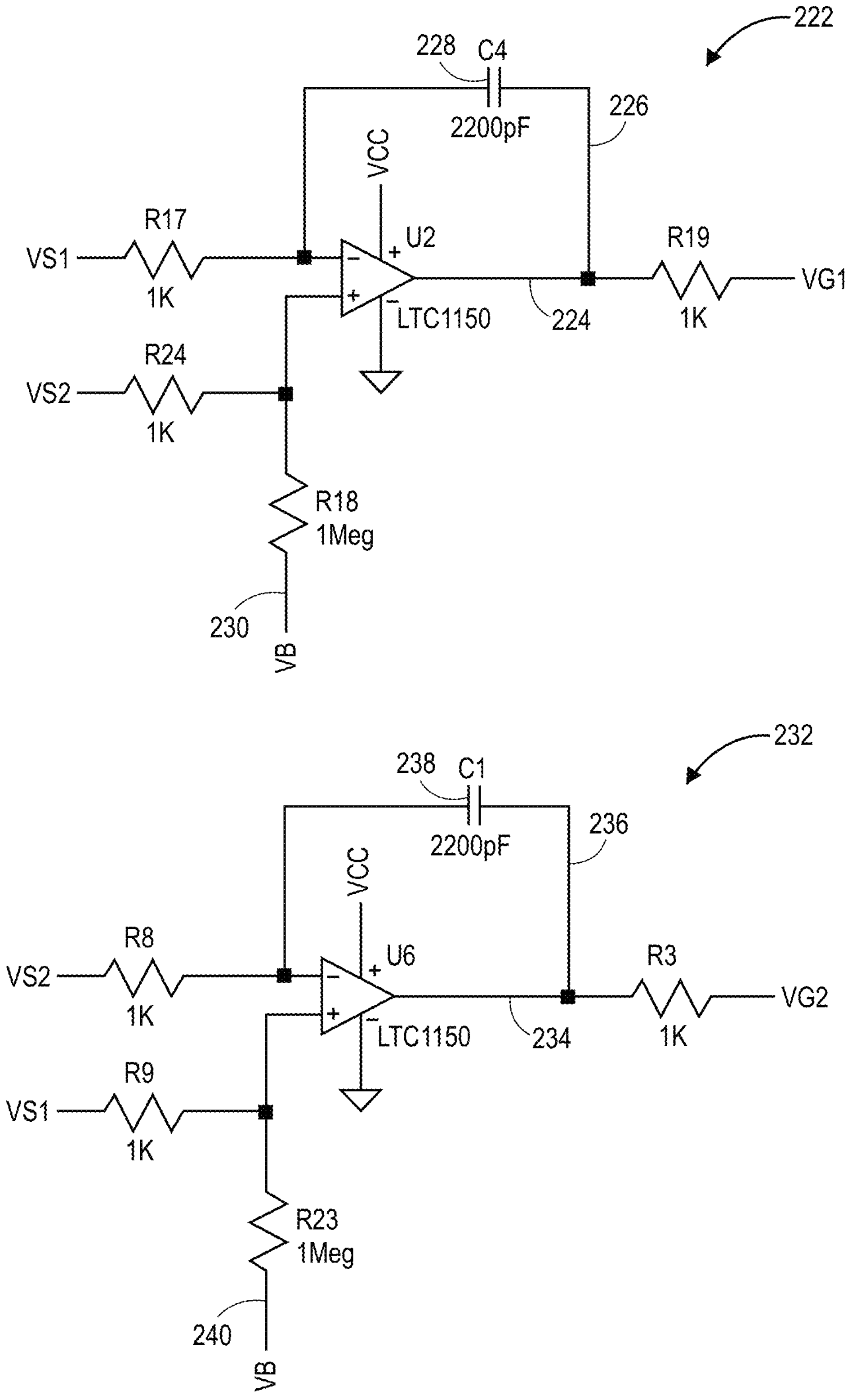
FIG. 4 is a schematic depiction of first and second differential amplifiers included in the circuit for sharing current between parallel LED pathways.

FIG. 4 depicts the first and second differential amplifiers 222, 232. The first differential amplifier 222 receives the first sensed voltage ($V_{S1}$) from the first measurement node 206 at its inverting input, the second sensed voltage ($V_{S2}$) from the second measurement node 216 at its non-inverting input, and generates the first output voltage ($V_{G1}$) that is applied to the gate of the first transistor 204. The bias voltage ($V_B$) can also be applied to the non-inverting input of the first differential amplifier 222. The second differential amplifier 232 receives the first sensed voltage ($V_{S1}$) from the first measurement node 206 at its non-inverting input, the second sensed voltage ($V_{S2}$) from the second measurement node 216 at its inverting input, and generates the second output voltage ($V_{G2}$) that is applied to the gate of the second transistor 214. The bias voltage ($V_B$) can also be applied to the non-inverting input of the second differential amplifier 232.

The current source 102 can be controlled by, for example, the controller 101. In some embodiments, the current generated by the current source 102 can vary over time according to control signals received from the controller 101. In one embodiment, for example, the current can be stepped between 400 mA and 500 mA. In some embodiments, this can be used to characterize a response to a change in conditions by the circuit 100. In some embodiments, for example, the current can be varied to adjust illumination of, for example, a biological sample.

Figure 5:
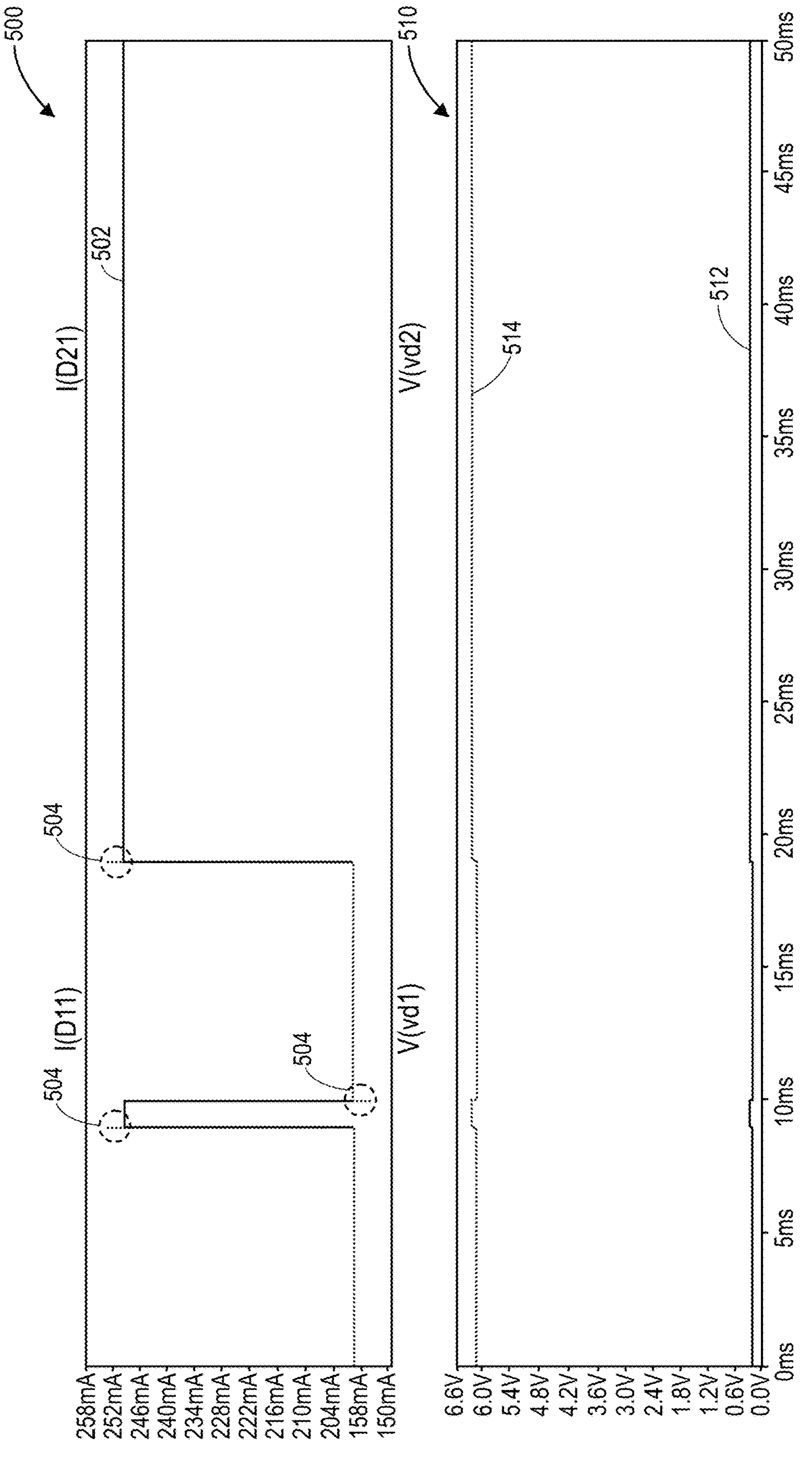
FIG. 5 is a graphical depiction of exemplary performance of one implementation of one embodiment of a circuit for sharing current between parallel LED pathways.

With reference now to FIG. 5, graphs 500 and 510 depicting performance of the circuit 100 shown in FIGS. 3 and 4 are shown. A first graph 500 depicts a current passing through each of the first LED pathway 104-A and the second LED pathway 104-B. Although there are separate traces in this graph for each of the LED pathways 104-A, 104-B, these appear as a single trace 502 as the traces for the current through the LED pathways 104-A, 104-B overlap with the exception of a short time after each of the step changes 504 to the current.

A second graph 510 depicts voltage drops across the transistors 204, 214. This graph includes a first trace 512 showing the voltage drop across the first transistor 204, and a second trace 514 showing the voltage drop across the second transistor 214. As seen in the second graph, the first transistor 204 has been driven to saturation, and the majority of the voltage drop shown is the result of first resistor 208, also referred to herein as first sense resistor 208. Due to the lesser number of LEDs in the second LED pathway 104-B, the voltage drop across the second transistor 214, shown in trace 514, is larger than the voltage drop across the first transistor 204 as shown in trace 512, and thus the current through the first LED pathway 104-A is equal to the current through the second LED pathway 104-B.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A circuit for sharing current between parallel LED pathways, the circuit comprising:
- a first LED pathway comprising:
  - a first set of LEDs, the first set of LEDs comprising one or more first LEDs;
  - a first transistor coupled to the first set of LEDs and configured to control a first current through the first set of LEDs by altering a first conductivity between a first source and a first drain based on a first voltage applied to a first gate of the first transistor; and
  - a first measurement node comprising a first sensed voltage;
- a second LED pathway comprising:

a second set of LEDs, the second set of LEDs comprising one or more second LEDs;

a second transistor coupled to the second set of LEDs and configured to control a second current through the second set of LEDs by altering a second conductivity between a second source and a second drain based on a second voltage applied to a second gate of the second transistor; and a second measurement node comprising a second sensed voltage;

a first differential amplifier configured to compare the first sensed voltage to the second sensed voltage and to output the first voltage, wherein the first voltage is applied to the first gate of the first transistor, wherein the first differential amplifier is configured to affect the first current through the first set of LEDs by altering the first conductivity between the first source and the first drain, wherein the first differential amplifier comprises a first inverting input coupled to the first measurement node and a first non-inverting input coupled to the second measurement node, wherein one of the inputs of the first differential amplifier is coupled to a bias node; and a second differential amplifier configured to compare the second sensed voltage to the first sensed voltage and to output the second voltage, wherein the second voltage is applied to the second gate of the second transistor, wherein the second differential amplifier comprises a second inverting input coupled to the second measurement node and a second non-inverting input coupled to the first measurement node, wherein one of the inputs of the second differential amplifier is coupled to the bias node, wherein the second differential amplifier is configured to affect the second current through the second set of LEDs by altering the second conductivity between the second source and the second drain.

2. The circuit of claim 1, wherein a first resistance generated by the first set of LEDs matches a second resistance generated by the second set of LEDs.

3. The circuit of claim 1, wherein a first resistance generated by the first set of LEDs is greater than a second resistance generated by the second set of LEDs.

4. The circuit of claim 1, wherein a first resistance generated by the first set of LEDs is less than a second resistance generated by the second set of LEDs.

5. The circuit of claim 1, wherein the first set of LEDs comprises a first number of LEDs, and wherein the second set of LEDs comprises a second number of LEDs.

6. The circuit of claim 5, wherein the first number of LEDs is equal to the second number of LEDs.

7. The circuit of claim 5, wherein the first number of LEDs is greater than the second number of LEDs.

8. The circuit of claim 1, wherein the first non-inverting input of the first differential amplifier is coupled to the bias node, and wherein the second non-inverting input of the second differential amplifier is coupled to the bias node.

9. The circuit of claim 8, wherein the bias node is configured to apply an additional voltage to each of the first non-inverting input and the second non-inverting input.

10. The circuit of claim 9, wherein the additional voltage applied to the first non-inverting input is the same as the additional voltage applied to the second non-inverting input.

11. The circuit of claim 9, wherein the additional voltage is less than one percent of either of the first sensed voltage and the second sensed voltage.

12. The circuit of claim 9, wherein the first differential amplifier and the second differential amplifier together balance the current through the first LED pathway and through the second LED pathway.

13. The circuit of claim 12, wherein the additional voltage drives at least one of the first transistor and the second transistor to saturation.

14. The circuit of claim 12, wherein balancing the current through the first LED pathway and through the second LED pathway comprises relatively increasing the current through the first LED pathway to match the current through the second LED pathway.

15. The circuit of claim 12, wherein balancing the current through the first LED pathway and through the second LED pathway comprises relatively decreasing the current through the first LED pathway to match the current through the second LED pathway.

16. A method of controlling current through parallel LED pathways, the method comprising:

generating a current with a current source coupled with a first LED pathway and a second LED pathway, wherein, the first LED pathway comprises:

a first set of LEDs, the first set of LEDs comprising one or more first LEDs;

a first transistor coupled to the first set of LEDs and configured to control a first current through the first set of LEDs by altering a first conductivity between a first source and a first drain based on a first voltage applied to a first gate of the first transistor; and a first measurement node comprising a first sensed voltage; and wherein the second LED pathway comprises:

a second set of LEDs, the second set of LEDs comprising one or more second LEDs;

a second transistor coupled to the second set of LEDs and configured to control a second current through the second set of LEDs by altering a second conductivity between a second source and a second drain based on a second voltage applied to a second gate of the second transistor; and a second measurement node comprising a second sensed voltage;

applying a first bias voltage to the first non-inverting input of a first differential amplifier;

applying a second bias voltage to the second non-inverting input of a second differential amplifier;

receiving a first sense voltage and a second sense voltage as inputs to a first differential amplifier;

adjusting the first conductivity of the first transistor by applying a first voltage output from the first differential amplifier to the first gate of the first transistor;

receiving the first sense voltage and the second sense voltage as inputs to a second differential amplifier; and adjusting the second conductivity of the second transistor by applying a second voltage output from the second differential amplifier to the second gate of the second transistor, wherein the first conductivity of the first transistor and the second conductivity of the second transistor are adjusted to match the first current passing through the first LED pathway to the second current passing through the second LED pathway.

17. The method of claim 16, wherein the first LED pathway comprises a first resistance generated by a first set of LEDs and the second LED pathway comprises a second resistance generated by a second set of LEDs.

18. The method of claim 17, wherein the first resistance matches the second resistance.

19. The method of claim 16, wherein the first differential amplifier receives the first sense voltage at a first inverting input and receives the second sense voltage at a first non-inverting input, and wherein the second differential amplifier receives the second sense voltage at a second inverting input and receives the first sense voltage at a second non-inverting input.

20. The method of claim 16, wherein the first bias voltage and the second bias voltage are equal.

21. The method of claim 16, wherein the first bias voltage and the second bias voltage are each less than one percent of either of the first sense voltage and the second sense voltage.

22. The method of claim 16, wherein the first bias voltage and the second bias voltage drives at least one of the first transistor and the second transistor to saturation.

23. The method of claim 16, wherein matching the first current passing through the first LED pathway to the second current passing through the second LED pathway comprises relatively increasing the current through the first LED pathway to match the current through the second LED pathway.

24. The method of claim 16, wherein matching the first current passing through the first LED pathway to the second current passing through the second LED pathway comprises relatively decreasing the current through the first LED pathway to match the current through the second LED pathway.

* * * * *